Patented Aug. 22, 1933

1,923,095

UNITED STATES PATENT OFFICE 1,923,095

METHOD OF CHLORINATING SULPHIDE ORES

Leslie G. Jenness, Brooklyn, N. Y., assignor to Intermetal Corporation, New York, N. Y., a Corporation of Delaware No Drawing. Application October 3, 1931
Serial No. 566,817

7 Claims. (Cl. 75—67)

My present invention relates to the chlorination of sulphide ores. Other processes have been devised to chlorinate sulphide ores by passing chlorine gas over the heated ore. However, such processes require relatively high temperatures and are otherwise inefficient in that they yield in a given time comparatively small recoveries of the chlorides of the metals, and moreover the desired end product tends to be contaminated at the high temperatures used with impurities and undesirable chlorides.

It has also been proposed to chlorinate sulphide ores by treating the heated ore with a gaseous reagent consisting of sulphur monochloride; also with chlorine and sulphur monochloride. In these processes, the end products are the chlorides of the metals, free sulphur and sulphur monochloride. However, I will hereafter show that such processes are very inefficient and that, for example, chlorine volatilizes only about 5% of the molybdenum from its sulphide ore in the same time that a 3 to 1 ratio of oxygen to chlorine in my process volatilizes 88% of the molybdenum at 375° C.; and it is even less efficient when sulphur monochloride is used in admixture with it.

An object of my invention is to increase the efficiency of the chlorination of sulphide ores both in amount and purity of product and at decreased cost of operation.

My process is applicable to metallic sulphides in general, such as the sulphides of such diverse metals as molybdenum, zinc, nickel and the sulphides of all other metals to which the process is found to be applicable. The chlorinated end product may be recovered whether by leaching it from the treated material or by volatilizing it from the heat-treated material and then recovering it by condensation.

In general, the process comprises passing a mixture of chlorine and oxygen gases over or through the sulphide ore heated to a suitable temperature to bring about the reaction. The ore is treated in finely divided form in a suitable furnace adapted to heat the ore to the required temperature and at the same time permit the mixture of oxygen and chlorine to be passed over the heated ore.

In the case of molybdenum sulphide ore, the preferred temperature for heating the ore is about 375° C., although other temperatures can be employed such as 300° C. but at this lower temperature the reaction is slower. The preferred ratio of oxygen to chlorine by volume in the reagent should be at least approximately five parts of oxygen to two parts of chlorine and preferably should have the higher ratio of three parts of oxygen to one part chlorine, and may have an even higher ratio. When the molybdenum sulphide ore is treated with the 3 to 1 ratio reagent, a materially higher recovery is obtained as compared with the recovery when the ratio is 5 to 2, other conditions being the same. Increasing the ratio of oxygen to chlorine to 4 to 1 in the reagent increases the rate of volatilization of the recovered molybdenum compound only slightly.

Instead of using pure oxygen, atmospheric air may be employed. One reason for the relatively slight increase in the rate of volatilization at higher than 3 to 1 ratios of oxygen to chlorine is due to the fact that, especially if atmospheric air is used for the oxygen, the volume of gases passing through the furnace is then so large that it decreases the time of contact between the active elements of the gas and the ore, and furthermore cools the ore and decreases the chemical effect. The economic balance between the increased rate of volatilization and the heat necessary to raise the temperature of the gaseous reagent is the deciding point in determining the best oxygen to chlorine ratio to employ in commercial practice.

The end product of the process when applied to molybdenum sulphide ores is mainly a molybdenum oxychloride or a mixture of oxychlorides. I have identified at least two oxychloride end products, a brown crystalline product $MoOCl_2$ and an almost snow-white product $MoO_2Cl_2$ which is the more volatile of the two. The first tends to be formed and come over when the ratio of oxygen to chlorine is about 2 to 1, whereas the more volatile $MoO_2Cl_2$ tends to be formed and come over at higher ratios of oxygen to chlorine, such as 3 to 1 and 4 to 1.

In the molybdenum sulphide process there are undoubtedly small proportions present in the end product of the double chlorides of sulphur and molybdenum, also some of the single chloride $MoCl_3$. The formation of the more volatile $MoO_2Cl_2$ is favored not only by a higher ratio of oxygen to chlorine as stated, but also by a shorter period of contact between the reagent gases and the ore. Changing the oxygen to chlorine ratio also effects a change in the nature of the gaseous sulphur products leaving the furnace. These comprise sulphur dioxide, and sulphur trioxide, singly and in combination.

The following reaction illustrates the prior art process for treating sulphide ores with chlorine:

1.  $2MoS_2+5Cl_2=2MoCl_3+2S_2Cl_2$.

The following reactions illustrate my process using different ratios of oxygen to chlorine:

2. $MoS_2 + 5O_2 + 2Cl_2 = 2MoOCl_2 + 4SO_2$

3. $MoS_2 + 3O_2 + Cl_2 = MoO_2Cl_2 + 2SO_2$

The efficiency of my process is shown from the fact that chlorine alone (reaction No. 1) can be made to volatilize only about 5% of the molybdenum from its sulphide ore in the same time that a 3 to 1 ratio of oxygen to chlorine in my process volatilizes 88% of the molybdenum from the same ore at 375° C. and 75% at 305° C. In other words, my oxygen-chlorine process is 15 to 18 times more efficient than the prior art chlorine process.

It will be noted that this reaction No. 1 of the prior art produces sulphur monochloride as a by-product and this fact explains its inefficiency because sulphur monochloride tends to slow down and reverse the reaction. This I have proved by treating the ore with a mixture of chlorine and sulphur monochloride and have found that this combined reagent is even less effective than chlorine alone to volatilize molybdenum from its sulphide.

Reaction No. 2 shows the desirability, when treating a molybdenum sulphide ore by my process, of having at least a 5 to 2 ratio of oxygen to chlorine because any ratio below this must allow both reactions Nos. 1 and 2 to take place with the production of the repressive sulphur monochloride. In reaction No. 2, the less volatile oxychloride is produced; but this is apparently much more volatile than the single chloride MoCl₃ of reaction No. 1; and moreover, the repressive effect of sulphur monochloride is eliminated.

Reaction No. 3 shows a 3 to 1 ratio of oxygen to chlorine and produces the more volatile oxychloride $MoO_2Cl_2$, and sulphur dioxide.

It is doubtful if the exact regulation of the oxygen to chlorine ratio can control or confine the reaction to either one of reactions Nos. 2 or 3 in commercial practice because the rate of gas flow will have its influence upon the equilibrium of the reaction. However, the particular ratio used will cause the majority of the molybdenum to react as indicated for that ratio, and the resultant efficiency will be many times that accomplished by the use of chlorine alone.

The main impurity of molybdenum sulphide ores is iron. To produce an exceptionally pure molybdenum end product free from iron, this may be accomplished by revolatilization of the molybdenum end product at 125° C.

The 3 to 1 ratio by volume of oxygen to chlorine for the treatment of sulphide ores is the highest preferred ratio for commercial operation of the process with most ores because, using the air for its oxygen, the gas volume to be handled higher than this ratio is so disproportionately large as to have too much effect on the efficiency of the reaction as already explained.

The herein process is also applicable to other sulphide ores and materials such, for example, as zinc, nickel, copper sulphides and copper-nickel sulphide mattes.

In treating the zinc sulphide ores, the zinc material should preferably not be too concentrated because the chlorinated zinc compound formed by the process coats over the remaining unacted upon particles of the ore limiting further action. Accordingly, to treat a rich zinc sulphide ore, I mix with it enough inert material, such as sand, so that the resulting mixture contains about 10% of zinc sulphide. With such a mixture, the process goes forward with efficient conversion to the chlorinated end product which can then be leached out with hot water and the zinc recovered from that solution in any preferred manner. A 3 to 1 ratio of oxygen to chlorine may be employed and a furnace temperature of about 310° to 320° C. The oxygen-chlorine reagent of my process gives a 50% greater yield than when chlorine alone is used under the same conditions. The presence of oxygen in the reagent increases the rate of the reaction, produces sulphur dioxide in place of sulphur monochloride in the exit gases and produces more zinc soluble salts per liter of chlorine employed.

The process is also applicable to the treatment of copper and nickel sulphide ores. The copper and nickel are readily chlorinated from their sulphide ores with production of sulphur dioxide in the exit gases, instead of sulphur monochloride, as in the chlorine process of the prior art. Moreover, the oxygen-chlorine reagent chlorinates the copper and nickel sulphide ores at a faster rate and with considerably increased recovery per unit weight of chlorine as compared with the prior art process.

The process is also applicable with advantage to other metallic sulphide materials such as copper, nickel sulphide matte although this material is not a true sulphide, but nevertheless undoubtedly contains lower sulphides of these metals. In this case it was found that little or no sulphur dioxide occurred in the exit gases. On the other hand, when treating this matte with pure chlorine, sulphur monochloride was formed but there was no evidence of sulphur monochloride when the oxygen-chlorine reagent of the present invention was used. Therefore, the repressing action of sulphur monochloride on the chlorinating reaction is avoided by my process, with the result that the rate of reaction is greatly increased as compared with the use of chlorine alone. Moreover, much more copper and nickel are converted to the soluble state per unit quantity of chlorine when oxygen is present, or if the temperature is increased more copper can be volatilized per unit quantity of chlorine.

The lower sulphides of nickel and copper present in these mattes allow the formation of sulphates and oxychlorides at a temperature of 310° to 320° C. employing a 2 to 1 or better ratio of oxygen to chlorine for the reagent.

Some of the advantages of the process may be stated as follows:

The use of the oxygen and chlorine reagent as compared to chlorine alone causes (1) more rapid volatilization of the metal from its sulphide ore; (2) more of the valuable end product is volatilized per unit quantity of chlorine; (3) a lower working temperature is permitted for the efficient utilization of the chlorine.

Other features of the process are:

(1) The efficiency of the process and the rapidity of volatilization of the valuable end product increases rapidly with the addition of oxygen to the chlorine of the reagent up to a ratio of oxygen-chlorine of 3 to 1, after which the increase is slower.

(2) Air can be used for its oxygen instead of pure oxygen in the reagent.

Some of the reasons for these advantages may be stated as follows:

(1) The by-product is sulphur dioxide instead of sulphur mono-chloride, thereby avoiding the repressive action of the latter upon the chlorination process and thereby achieving a faster rate of chlorination.

(2) The valuable end products are ordinarily more volatile than the straight chlorides and are usually oxychlorides. Therefore, a lower furnace temperature can be employed, or stated differently, these oxychlorides will volatilize more rapidly at a given temperature.

(3) These oxychlorides contain less chlorine relatively to the metal than the single chlorides. Therefore, less chlorine is required to volatilize a given quantity of the metal. In other words, more metal can be converted into a soluble or volatilized form from the sulphide material per unit quantity of chlorine by my process than by the prior art chlorine process of reaction No. 1.

From the foregoing description it will be appreciated that with the present invention it is possible to treat the raw material suitably crushed and, if desired, diluted in an inert material such as, for example, sand, without first mixing the material with a chloride or other chemically active substance as has been heretofore proposed. The process of the invention is a chlorinating process as distinct from a chloridizing process,— that is to say, gaseous chlorine is used for treating raw crushed material instead of using a chloride such as, for instance, sodium chloride mixed with the material in ground form.

What I claim is:

1. The process which comprises chlorinating metallic sulphide material by heating said material and reacting it with oxygen and chlorine gases simultaneously, the ratio of oxygen to chlorine being not substantially lower than five parts by volume of oxygen to two parts of chlorine.

2. The process which comprises chlorinating metallic sulphide material by heating said material and reacting it with oxygen and chlorine gases simultaneously, the ratio of oxygen to chlorine being substantially three parts by volume of oxygen to one part of chlorine.

3. The process which comprises chlorinating metallic sulphide material by heating said material and reacting it with oxygen and chlorine gases simultaneously in a ratio of the gases which converts the sulphide to an oxychloride of the metal.

4. The process which comprises chlorinating metallic sulphide material by heating and causing the finely divided material to react with oxygen and chlorine gases simultaneously the ratio of oxygen to chlorine being sufficiently high so that the sulphur of said sulphide material is substantially all oxidized to sulphur dioxide.

5. The process which comprises chlorinating metallic sulphide material by heating and reacting the material with oxygen, and chlorine gases simultaneously, said gases passing over the heated material having an oxygen to chlorine ratio which converts the sulphide to a chlorine compound of the metal and produces sulphur dioxide as a by-product in substantial proportion to the amount of the sulphur in the metallic sulphide.

6. The process of chlorinating metallic sulphide material which comprises heating the material in the presence of chlorine gas; and converting the sulphur of said sulphide material substantially all to sulphur dioxide by treating the material simultaneously with a sufficiently high ratio of oxygen.

7. The process which comprises chlorinating metallic sulphide material by heating and reacting said material with oxygen and chlorine gases simultaneously, said gases passing over the heated material having an oxygen to chlorine ratio sufficient to chlorinate the desired metallic constituent in said material and to oxidize substantially all the sulphur present in said ore.

LESLIE G. JENNESS.

Certificate of Correction

Patent No. 1,923,095.   August 22, 1933.

LESLIE G. JENNESS

It is hereby certified that error appears in the printed specification of the above-numbered patent requiring correction as follows: Page 2, line 3, formula 2, for the first group of symbols " MoS₂," read $2 MoS_2$; and that the said Letters Patent should be read with this correction therein that the same may conform to the record of the case in the Patent Office.

Signed and sealed this 10th day of October, A. D. 1933.

[SEAL.]
F. M. HOPKINS,
*Acting Commissioner of Patents.*

(2) The valuable end products are ordinarily more volatile than the straight chlorides and are usually oxychlorides. Therefore, a lower furnace temperature can be employed, or stated differently, these oxychlorides will volatilize more rapidly at a given temperature.

(3) These oxychlorides contain less chlorine relatively to the metal than the single chlorides. Therefore, less chlorine is required to volatilize a given quantity of the metal. In other words, more metal can be converted into a soluble or volatilized form from the sulphide material per unit quantity of chlorine by my process than by the prior art chlorine process of reaction No. 1.

From the foregoing description it will be appreciated that with the present invention it is possible to treat the raw material suitably crushed and, if desired, diluted in an inert material such as, for example, sand, without first mixing the material with a chloride or other chemically active substance as has been heretofore proposed. The process of the invention is a chlorinating process as distinct from a chloridizing process,—that is to say, gaseous chlorine is used for treating raw crushed material instead of using a chloride such as, for instance, sodium chloride mixed with the material in ground form.

What I claim is:

1. The process which comprises chlorinating metallic sulphide material by heating said material and reacting it with oxygen and chlorine gases simultaneously, the ratio of oxygen to chlorine being not substantially lower than five parts by volume of oxygen to two parts of chlorine.

2. The process which comprises chlorinating metallic sulphide material by heating said material and reacting it with oxygen and chlorine gases simultaneously, the ratio of oxygen to chlorine being substantially three parts by volume of oxygen to one part of chlorine.

3. The process which comprises chlorinating metallic sulphide material by heating said material and reacting it with oxygen and chlorine gases simultaneously in a ratio of the gases which converts the sulphide to an oxychloride of the metal.

4. The process which comprises chlorinating metallic sulphide material by heating and causing the finely divided material to react with oxygen and chlorine gases simultaneously the ratio of oxygen to chlorine being sufficiently high so that the sulphur of said sulphide material is substantially all oxidized to sulphur dioxide.

5. The process which comprises chlorinating metallic sulphide material by heating and reacting the material with oxygen, and chlorine gases simultaneously, said gases passing over the heated material having an oxygen to chlorine ratio which converts the sulphide to a chlorine compound of the metal and produces sulphur dioxide as a by-product in substantial proportion to the amount of the sulphur in the metallic sulphide.

6. The process of chlorinating metallic sulphide material which comprises heating the material in the presence of chlorine gas; and converting the sulphur of said sulphide material substantially all to sulphur dioxide by treating the material simultaneously with a sufficiently high ratio of oxygen.

7. The process which comprises chlorinating metallic sulphide material by heating and reacting said material with oxygen and chlorine gases simultaneously, said gases passing over the heated material having an oxygen to chlorine ratio sufficient to chlorinate the desired metallic constituent in said material and to oxidize substantially all the sulphur present in said ore.

LESLIE G. JENNESS.

Certificate of Correction

Patent No. 1,923,095.            August 22, 1933.

LESLIE G. JENNESS

It is hereby certified that error appears in the printed specification of the above-numbered patent requiring correction as follows: Page 2, line 3, formula 2, for the first group of symbols " $MoS_2$," read $2\ MoS_2$; and that the said Letters Patent should be read with this correction therein that the same may conform to the record of the case in the Patent Office.

Signed and sealed this 10th day of October, A. D. 1933.

[SEAL.]            F. M. HOPKINS,
*Acting Commissioner of Patents.*

Certificate of Correction

Patent No. 1,923,095.　　　　　　　　　　　　　　　　　　　　August 22, 1933.

LESLIE G. JENNESS

It is hereby certified that error appears in the printed specification of the above-numbered patent requiring correction as follows: Page 2, line 3, formula 2, for the first group of symbols "$MoS_2$," read *2 MoS$_2$*; and that the said Letters Patent should be read with this correction therein that the same may conform to the record of the case in the Patent Office.

Signed and sealed this 10th day of October, A. D. 1933.

[SEAL.]　　　　　　　　　　　　　　　　　　　　　　　　　F. M. HOPKINS,
　　　　　　　　　　　　　　　　　　　　　　　　*Acting Commissioner of Patents.*